(12) United States Patent  (10) Patent No.: US 7,898,214 B2
Robertsson  (45) Date of Patent: Mar. 1, 2011

(54) WIRELESS CHARGEABLE ENERGY CELL

(75) Inventor: Mats Robertsson, Stockholm (SE)

(73) Assignee: Acreo AB, Kista (SE)

( * ) Notice: Subject to any disclaimer, the term of this patent is extended or adjusted under 35 U.S.C. 154(b) by 484 days.

(21) Appl. No.: 11/898,707

(22) Filed: Sep. 14, 2007

(65) Prior Publication Data

US 2008/0272737 A1  Nov. 6, 2008

Related U.S. Application Data

(60) Provisional application No. 60/924,240, filed on May 4, 2007.

(30) Foreign Application Priority Data

May 4, 2007  (EP) .................................. 07107580

(51) Int. Cl.
  *H02J 7/00*  (2006.01)
(52) U.S. Cl. ....................................... 320/108; 455/573
(58) Field of Classification Search ................. 320/106, 320/108, 128
  See application file for complete search history.

(56) References Cited

U.S. PATENT DOCUMENTS

| | | | |
|---|---|---|---|
| 4,084,511 A | 4/1978 | Svrjcek, Jr. | |
| 5,763,058 A | 6/1998 | Isen et al. | |
| 5,912,759 A | 6/1999 | Good et al. | |
| 6,127,799 A * | 10/2000 | Krishnan | ..................... 320/104 |
| 6,809,498 B2 * | 10/2004 | Nakamura et al. | ........... 320/108 |
| 7,048,605 B2 * | 5/2006 | Hawthorne et al. | ......... 446/358 |

(Continued)

FOREIGN PATENT DOCUMENTS

EP  1 720 188 A2  11/2006

(Continued)

OTHER PUBLICATIONS

A. Vadivel Murugan, "Novel organic-inorganic poly (3,4-ethylenedioxythiophene) based nanohybrid materials for rechargeable lithium batteries and supercapacitors," Journal of Power Sources 159 (2006) pp. 312-318.

(Continued)

*Primary Examiner*—Edward Tso
*Assistant Examiner*—Ramy Ramadan
(74) *Attorney, Agent, or Firm*—Harness, Dickey & Pierce, P.L.C.

(57) ABSTRACT

One embodiment of the present invention discloses a circuitry and an element which can be activated, charged, or interacted using any useful source of EM-radiation which is able to emit a suitable EM-field, which circuitry or element can be produced in a cost-effective manner, as well as a method for charging the same. The circuitry or element includes an antenna for receiving and converting EM-radiation into electric energy; a rectifier for converting the energy to a rectified current, and a dechargeable energy cell. The energy cell includes, in at least one embodiment, a first and a second electrochemically active element, which are electronically separated from each other, and an electrolyte which is arranged in ionic contact with at least a portion of both the first and second electrochemically active element, wherein the energy cell is arranged to receive rectified current from the rectifier, and to convert the rectified current into stored energy by altering its electrochemical state in response to the rectified current.

35 Claims, 7 Drawing Sheets

U.S. PATENT DOCUMENTS

| | | | |
|---|---|---|---|
| 7,482,620 B2* | 1/2009 | Kugler et al. | 257/40 |
| 2004/0217877 A1 | 11/2004 | Kokonaski et al. | |
| 2004/0256644 A1* | 12/2004 | Kugler et al. | 257/288 |

FOREIGN PATENT DOCUMENTS

| | | |
|---|---|---|
| WO | WO 03/047009 | 6/2003 |

OTHER PUBLICATIONS

Masaharu Satoh, "Organic Radical Battery and Its Technology," NEC Journal of Advanced Technology, vol. 2, No. 3, pp. 262-263.

Ralph J. Brodd et al., "Batteries, 1977 to 2002," Journal of The Electrochemical Society, 151 (3) K1-K11 (2004).

Soeren Steudel, et al., "50 MHz rectifier based on an organic diode," Nature Publishing Group 24, vol. 4, Aug. 2005.

J.C. Gustafsson et al., "In situ spectroscopic investigations of electrochromism and ion transport in a poly (3,4-ethylenedioxythiophene) electrode in a solid state electrochemical cell," Solid State Ionics 69 (1994) pp. 145-152.

Philippe Schottland, et al., "Poly(3,4-alkylenedioxypyrrole)s: Highly Stable Electronically Conducting and Electrochromic Polymers," Macromolecules (2000), 33, pp. 7051-7061.

Mitsuyoshi Onoda, et al., "Properties of Electrochemically Cation-Doped Poly(isothianaphthene)" Journal of the Electrochemical Society, vol. 141, No. 2, Feb. 1994, pp. 338-341.

* cited by examiner

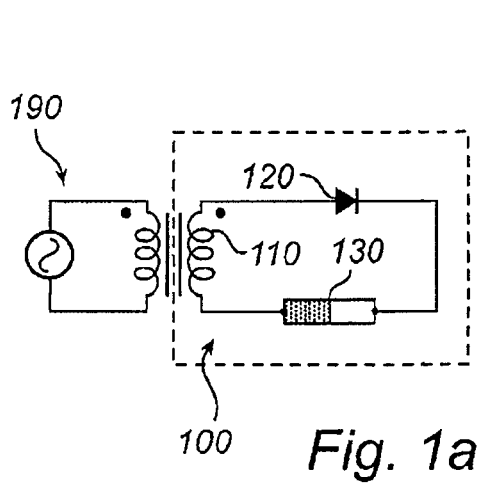 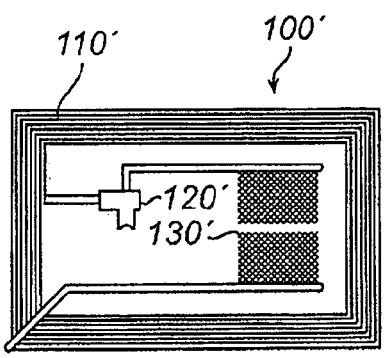
Fig. 1a   Fig. 1a´
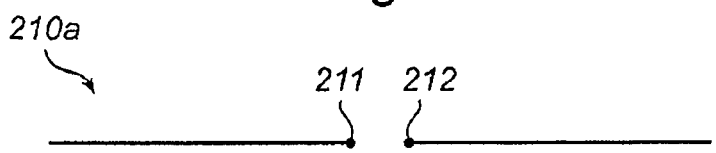
Fig. 2a
Fig. 2b
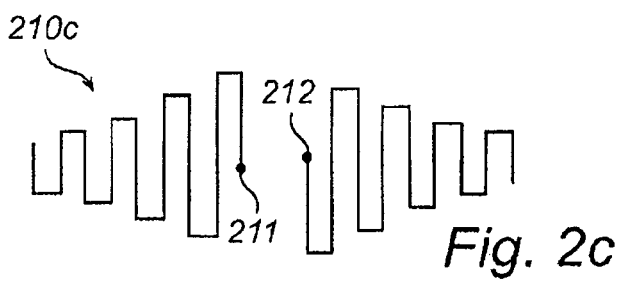
Fig. 2c
Fig. 2d
Fig. 2d´

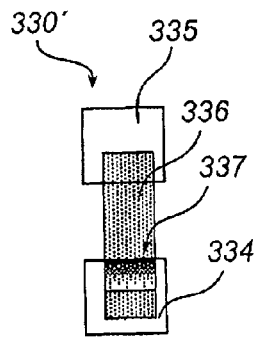
Fig. 3a
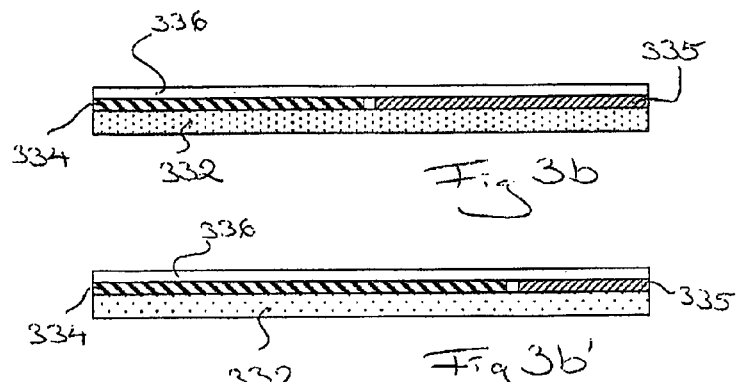
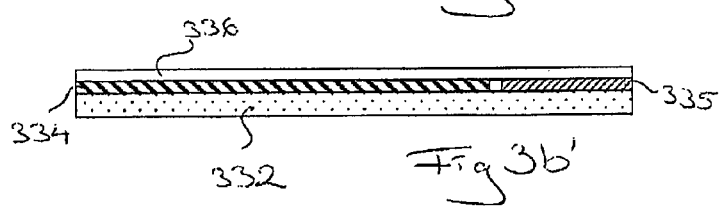
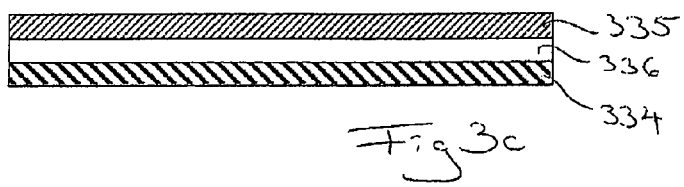
Fig 3c
Fig 3c'
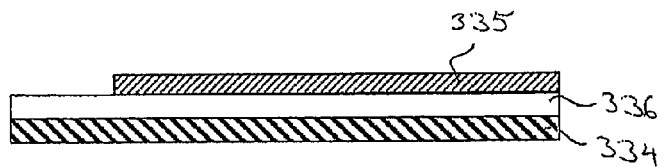
Fig 3d
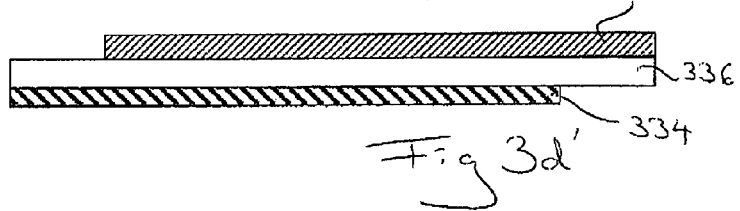
Fig 3d'

WIRELESS CHARGEABLE ENERGY CELL

This application claims benefit under 35 U.S.C. §119(e) to United States Provisional Patent Application No. 60/924,240, filed on May. 4, 2007 in the United States Patent Office, and under 35 U.S.C. §119 to Swedish Patent Application 07107580.5, filed on May. 4, 2007, the entire contents of each of which is hereby incorporated herein by reference.

TECHNICAL FIELD

The present invention relates to batteries or energy cells, and in particular to chargeable, printable batteries or energy cells—as well as methods for manufacturing the same.

BACKGROUND

Electrochemical electronics is known from e.g. WO03/047009A1, which is referred to for a closer understanding of this technology, and the entire contents of which is hereby incorporated herein by reference.

Just like in other types of electronic devices, there is a need for controlling (i.e. starting or stopping) a current flow in a circuit.

Conventionally, the control of the currents within a circuitry of electrochemical electronics has been performed by applying and removing an electric voltage/current to the polymer based electrical component. One way of controlling the voltage/current is to electronically couple and drain a battery, which battery is arranged such that enough voltage is applied to the electrical component for a sufficiently long time. Another way is to use a mechanical switch e.g. a membrane switch, or an IC controlled switch e.g. a capacitive push button.

One example of such a mechanical switch is provided in U.S. Pat. No. 5,912,759, which discloses a switch arm comprising a metal film, which subsequent to removal of a protective tape connects two electrodes.

A disadvantage with this switch is that it is complicated to manufacture and to operate, in particular with respect to the application and removal of the protective tape.

U.S. Pat. No. 5,763,058 discloses another type of switch, wherein the electrodes are placed on top of each other, separated by a fragile or resilient insulating layer having a plurality of holes or voids therein. When a force is applied to the electrodes, the insulating layer is broken or deformed, so as to allow contact between the electrodes.

The switch disclosed in U.S. Pat. No. 5,763,058 requires two layers of conducting material and one layer of insulating material to be deposited onto the substrate. Hence, it requires at least three production steps.

Other types of known switches comprise membrane switches or switches controlled by integrated circuits, such as capacitive push buttons etc. Stopping currents has been achieved by draining batteries, e.g. using mechanical switches coupled to many small batteries in parallel.

One known electrolytic switch is disclosed in U.S. Pat. No. 4,084,511, which describes an electrolytic timing element, wherein the degrading oxidation of the anode in an electrolytic liquid releases a spring, which activates the switch to arm a mine.

However, all of these solutions require more or less complicated structures, which are not easy to realize in a printing process or in a reel-to-reel process.

SUMMARY OF THE INVENTION

It is an object to provide a chargeable electrochemical circuit, which can be produced in a cost-effective manner by e.g. a printing technique or by a reel-to-reel technique.

The object is wholly or partially achieved by a chargeable circuit according to the appended independent claims. Embodiments are set forth in the appended dependent claims an in the following description and drawings.

Semiconducting and conducting organic materials, both polymers and molecules, have successfully been included in a large range of electronic devices, e g electrochemical devices, for instance as dynamic colorants in smart windows and in polymer batteries. Reversible doping and de-doping involving mobile ions switches the material between different redox states.

The invention is built on an insight of a new, advantageous use of a chargeable circuit, preferably comprising electrical conducting polymers, which use provides numerous advantages as described below. The invention relates for example to use of an electromagnetic field-affectable chargeable circuit element as a remotely (re)-chargeable energy source, i.e. a chargeable and/or a rechargeable energy source, for powering or energy supplying of one or several electrical components.

According to a first aspect thereof, the present invention relates to a circuitry comprising:

- an antenna arranged to receive EM-radiation from an external source and to convert it into electric energy;
- a rectifier arranged to receive electric energy from said antenna and convert sa1id energy to a rectified current; and
- a dechargeable energy cell arranged to receive rectified current from said rectifier, and to convert said rectified current into stored energy by altering its electrochemical state in response to said rectified current. The energy cell comprises:
- a first and a second electrochemically active element, which are electronically separated from each other, and
- an electrolyte which is arranged in ionic contact with at least a portion of both said first and second electrochemically active element.

According to a second aspect thereof, the invention relates to a self-supporting chargeable circuit element, which comprises a chargeable circuitry as described above, wherein the chargeable circuitry is arranged in or on a substrate. This facilitates an arrangement of the energy cell in direct electrical contact with other electrical components, which is to be powered by the energy cell. The other components are preferably arranged on the same support as said chargeable circuitry.

According to a third aspect thereof, the invention relates to a (re)chargeable device, which comprises a chargeable circuitry as described above. In other words the chargeable circuitry is integrated in or on a substrate of said (re)-chargeable device, and an electric current or voltage can be provided by the energy cell after the energy cell has been charged or loaded by use of an electromagnetic field.

A chargeable circuit as described above may be used for controlling, i.e. starting, stopping and/or altering a current of electrons or ions in a circuit containing an electrical component such as an electrochemical device, or controlling an electric current in a circuit containing silicon based electrical components. Controllable currents include power currents or signal currents. The chargeable circuit is easy and cost-effective to manufacture, since it may be produced using known printing techniques. The chargeable circuit may be used as a main energy source for a display, a transistor, a sensor, an RFID device, a timer, a delay element, a light emitting component such as a LED or any other electric device, based on electrochemical or silicon technology.

In this way the chargeable circuit can be used for wirelessly activating or starting an autonomous component, such as a use-once sensor, by charging the energy cell by means of EM-radiation, and later providing the component with the stored energy. Further, a re-useable sensor or other component can be activated at predetermined intervals, by re-charging the energy cell and provide energy to the component at these intervals. Moreover, a readout of an instantaneous or delayed message can be remotely started or activated by charging of the energy cell by means of EM-radiation. Further, energy from the remotely charged energy cell can be used to increase the sensitivity of or output signal level from a circuit e.g. an RFID-tags. Moreover, a delay circuit may be connected to a chargeable circuit, such that the additional component is activated by energy from the energy cell a predetermined time after the EM-field has been removed. Further, the circuitry of the RFID-tag may be arranged such that the tag can be read at any time after activation by the EM-field. Additionally, the time for de-charging the battery can be used as a timer.

In relation to this invention the term energy cell refers to electrochemical arrangements able to store and provide electric energy. Examples of such arrangements are batteries and capacitors, where a battery normally provides a substantially static potential and a capacitor normally provides a decreasing, e.g. linearly decreasing, potential. In other words, normally the potential provided by a battery varies with e.g. +/−10% or +/−5% from a nominal potential.

Chargeable and rechargeable energy cells of the chargeable circuitry may for example be arranged and manufactured as described in "Novel organic-inorganic poly (3,4-ethylenedioxythiophene) based nanohybrid materials for rechargeable lithium batteries and supercapacitors", by A. Vadivel Murugan, Journal of Power Sources 159 (2006) 312-318; in "Organic Radical Battery and Its Technology", by Masaharu SATOH, NEC Journal of Advanced Technology, Vol 2, No. 3; and in "Batteries, 1977 to 200", by Ralph J. Brodd et al. Journal of The Electrochemical Society, 151 (3) K1-K11 (2004).

According to one embodiment said circuit further comprises an additional component e.g. an electrical component the state of which is controllable by means of energy de-charged from said energy cell. In other words the additional component is electronically coupled to said energy cell such that the cell is able to provide said component with energy. In relation to this invention, a change of state of an electric component refers to a detectable change of state of said component, e.g. a change of color of a display, a change in conductivity of a transistor, a change in output from a sensor etc.

Further, the additional component is preferably arranged such that it is not substantially affectable by said EM-radiation. In other words, the change from a first predetermined state to a second predetermined state of said additional component will occur within a shorter amount of time when EM-radiation source is removed and the battery is de-charged, compared to when the battery is charged by use of an EM-field. The state of the additional component is not affected by said EM-field, e.g. because the additional component is arranged such that it does not receive a sufficient amount of said rectified to change its state from said first to the second predetermined state. In other word, the state of said additional electric component is preferably affectable to a larger extent by energy provided by said energy cell, compared to energy provided by said EM-field.

Moreover, the state of said component is preferably substantially or essentially controllable by energy supplied from said energy cell and substantially unaffected by said EM-radiation. In relation to this invention, this implies that the component is affected 10 times faster, and preferably a 100 times faster by said energy from said energy cell, compared to energy from said EM-field, when the electrical component is arranged in said chargeable circuitry.

According to another embodiment the component is effected both by said EM-radiation, and later by the de-charged energy from the energy cell once the EM-radiation source has been removed.

According to one embodiment the additional component is connected in parallel with said battery, such that it receives rectified current from said rectifier and a de-charge current from said energy cell.

According to one embodiment the circuit further comprises control means which are arranged to restrain, limit, decrease and/or control the amount of energy or current which is supplied from said dechargeable energy cell to said electrical component until a predetermined event has occurred, wherein the electrical component is arranged to be activated or change its state in response to said received energy. The predetermined event may e.g. equal that a predetermined time has lapsed from the moment the EM-field was brought within range of the antenna, and/or the antenna was brought within rage of the EM-field. Alternatively or additionally, the predetermined event may be or equal that a predetermined amount of current has reached the control means from the moment the EM-field and the antenna were brought within range of each other. In other words, the control means is normally arranged to change is state in response to said predetermined event, such that more current or energy is supplied from said energy cell to said electrical component. According to one example, when a first amount of time is required for altering the energy cell from a fully decharged to a fully charged state using a predetermined EM-field, then the predetermined event may occur after a time interval, which is at least 2 times, 5 times, 10 times, 50 times or at least 100 times longer compared to said first amount of time, has passed from the moment the antenna and the EM-field were brought within range of each other. According to another example, when a first amount of current is required for altering the energy cell from a fully decharged to a fully charged state using a predetermined EM-field, then the predetermined event may occur after an amount of current, which is at least 2 times, 5 times, 10 times, 50 times or at least 100 times larger compared to said first amount of current, has reached said timer device from the moment the antenna and the EM-field were brought within range of each other. Normally, but not necessarily, the control means is arranged such that after an additionally time has passed since the energy source was sufficiently charged, and the antenna and EM-field was separated from each other, the control means is switched from an active state to an inactive state, whereby more current is provided to the electrical component.

According to one embodiment a first amount of current is supplied to said electric component when the control means are active. This first amount of current is normally not enough to substantially alter the state of the electric component. When the control means is switched to its inactive state, a second amount of current is supplied to said electric component from said energy cells, wherein this second amount of current is sufficient to substantially alter the state of the electrical component.

According to one specific example said control means is a delay element or a timer, preferably arranged such that its impedance rises after a predetermined amount of current has passed therethrough.

According to one example, the electrical component is a LED, and the inventive circuit is used as a timing device. The timing device is arranged such that a predetermined time after an EM-field has been brought within rage of the antenna, a LED is lit. The timing device is operated by first wirelessly charging the energy cells, and simultaneously start a timer of the control device. After the energy cells have been sufficiently charged, the EM-source and the antenna are separated from each other, and when the timer later runs out, the state of the control device is altered and stored current from the energy cell is supplied to the LED such that it is lit. The LED remains lit as long as energy cell(s) is/are able to provide a sufficient amount of energy. This timing device is advantageous as it cost effective to manufacture, has a long shelf life, is easy to handle and is operated by wireless means. Instead of a LED, another type of electrical component may be powered by the energy storing cell such as a transistor, a sensor, an RFID device, a timer, a delay element or a display, or a combination of these elements.

The electrochemically active material or the electrochemically active element may comprise electrochemically active organic material or electrochemically active in-organic material. According to one embodiment both said first and said second electrochemically active elements are arrange of the same class of material, according to an alternative embodiment each of the two electrochemically active elements is arranged of a different class of materials, e.g. the first electrochemical element is arranged of an organic material and the second electrochemical element is arrange of metal.

According to one embodiment, the chargeable circuitry is further arranged with a second dechargeable energy cell comprising:

a first and a second electrochemically active element, which are electronically separated from each other, and an electrolyte which is arranged in ionic contact with at least a portion of both said first and second electrochemically active element, wherein said second energy cell is e.g. provided in series with said first energy cell. The two energy cells of said circuitries may be arranged of the same or different materials, and they are preferably arranged in series.

The use of electrically conducting polymer batteries or energy cells is advantageous, as it can be given almost any or at least a large variety of two dimensional shapes, is cheap to produce, normally environmentally friendly and possible to manufacture using conventional manufacturing processes such as printing techniques and e.g. roll to roll printing.

Charging or re-charging of the energy cell by means of an electromagnetic field (EM-field) is advantageous as it is performed by means of a non-contact method. In other words, less demand is normally put on the exact position of the energy source relative the energy cell compared to methods wherein the energy source is arranged in direct physical contact with the energy cell. Normally, non-contact charging of the energy cell facilitates a simultaneous charging several different energy cells, possibly provided on different substrates.

The chargeable circuitry can be provided on or in a substrate via a number of means. The circuitry can e.g. be provided directly on the substrate by means of printing or adhesion. Alternatively, the circuitry is first arranged on a carrier that is subsequently attached to or integrated into the substrate. The substrate may be made of any suitable material, such paper or plastic or combinations thereof. Preferably, the substrate is made of a flexible material.

According to one embodiment a paper based substrate is provided the surface of which is provided with a surface coat, such that the roughness of the paper is reduced and/or the durability of the paper is enhanced. This technique is well known for photographic papers, decorative papers and the like. Further, the chargeable circuitry is preferably arranged in direct electrical contact with other electrical components, which is to be powered by the energy cell.

According to one embodiment of the invention, the chargeable circuit is an energy source for printed electronics. The different components of the chargeable circuit can be deposited on the support by means of conventional printing techniques such as screen printing, intaglio printing, offset printing, ink-jet printing and flexographic printing, or coating techniques such a knife coating, doctor blade coating, extrusion coating and curtain coating, such as described in "Modern Coating and Drying Technology" (1992), eds E D Cohen and E B Gutoff, VCH Publishers Inc, New York, N.Y., USA. In those embodiments of the invention that utilise a conducting polymer as electron conducting material, this material can also be deposited through in situ polymerisation by methods such as electropolymerisation, UV-polymerisation, thermal polymerisation and chemical polymerisation. As an alternative to these additive techniques for patterning or forming the components, it is also possible to use subtractive techniques, such as local destruction of material through chemical or gas etching, by mechanical means such as scratching, scoring, scraping or milling, or by any other subtractive methods known in the art.

According to one embodiment the chargeable circuit is provided on the substrate simultaneously as the rest of the circuitry.

According to one embodiment, a protective layer is provided, which covers the chargeable circuitry. Preferably, the protective layer is made of a material which is durable, and even more preferred the protective layer is made of a durable, transparent material, such as a plastic over-laminate or a printed varnish layer. The printing of a varnish is advantageous as it facilitates the application of the protective layer locally on the substrate.

According to another aspect thereof, the invention relates to a chargeable circuit element which is arranged to be integrated in or on a target device e.g. a product, a product package or a support for electronic circuits. The chargeable circuit element or the chargeable circuit element comprises a chargeable circuit element layer or a carrier whereon the chargeable circuitry is arranged. This is advantageous as it facilitates the integration of the circuitry in or on the device, as the components of the circuitry are already arranged in electric contact with each other on the layer. Advantageously, the chargeable circuit element is self-contained, since this enables a facilitated integration of the chargeable circuitry in or on the target device.

According to one example the chargeable circuit element layer is made of a paper and/or plastic based material, the material is preferably selected from the group consisting of polyethylene terephthalate; polyethylene naphthalene dicarboxylate; polyethylene; polyvinylidene fluoride, polypropylene; paper; coated paper, e.g. coated with resins, polyethylene, or polypropylene; paper laminates; paperboard; corrugated board; glass and polycarbonate. These materials can also constitute the base for the target device.

According to one embodiment, several chargeable circuits are arranged preferably sequentially on a continuous elongated element layer, which layer is optionally wound on e.g. a reel, such that for instance mass production of product packages comprising chargeable circuits are facilitated. According to a further embodiment, the chargeable circuits are equally spaced along the chargeable circuit element layer. Alternatively, the chargeable circuits may be arranged at irregular intervals along the chargeable circuit element layer.

According to a further aspect thereof, the invention relates to a method of making a chargeable circuit element arranged as described above. The making of the chargeable circuit element preferably comprises the steps of:

providing a first and a second element layers;

arranging an antenna of electrically conducting material on said first element layer;

arranging a rectifier of electrically conducting material on either of said first and second element layer;

arranging an energy cell comprising electrochemically active material on either of said first and second element layers;

arranging electrical conductors of electrically conducting material on at least said first element layer, and attaching said first element layer to said second element layer, such that said rectifier is electrically connected to both said antenna and said energy cell, at least after said first and second layers have been attached to each other.

According to one embodiment said antenna, rectifier, electrical conductors and/or energy cell are/is arranged on the element layer by means of an additive method such as adhesion or printing. According to one embodiment said antenna, rectifier, electrical conductors and/or energy cell are/is arranged on the chargeable circuit element layer by means of a subtractive method such as etching or scraping. According to one embodiment at least one of said antenna, rectifier, electrical conductors and energy cell are arranged on the chargeable circuit element layer by means of a combination on additive and subtractive methods.

For example, one of said element layers may be provided with at least one substantially continuous layer of electrically conductive material, whereof at least a portion of said antenna, rectifier, electrical conductors and/or energy cell are/is formed by removing portions of said continuous layer according to a predetermined pattern.

Optionally, a conductive layer comprised in one of said element layers may be coated with an anti-corrosion layer, preferably in order to prevent deterioration of the conductive layer. Hence, an anti-oxidation layer may be applied on top of a conductive layer comprising e.g. Aluminium in order to prevent oxidation thereof.

According to one embodiment one or more of said antenna, rectifier, electrical conductors and/or energy cell are/is formed on said first chargeable circuit element layer, and the rest of the components are formed on said second element layer. Thereafter, the two element layers are attached to each other, such that the at least one component of the first element layer is arranged in electric contact with at least one of the components arranged on the second element layer.

Optionally, an adhesive layer may be provided on one of said element layers. Thereafter, said first and second element layers are attached to each other by being brought in contact with each other. The adhesion of the layers may be facilitated by pressure or heat being applied to said layers.

Alternatively, all components are formed on said first element layer and are optionally covered by a protective layer, such as a laminate or varnish e.g. having the same properties as described in relation to said chargeable circuit element.

Chargeable Circuitry

In essence, the invention provides a chargeable circuitry which can be activated, charged or interacted with using any useful source of EM-radiation which is able to emit a suitable EM-field, i.e. an EM-field which may be received and converted to sufficiently strong electric current in order to affect the energy cell, preferably within a desired time period. Thus, the charging of the energy cell does not require a specifically made charging unit. Rather an additional component comprised in or connected to said chargeable circuitry may for instance be loaded, activated or controlled using a suitable public or domestic source of EM-radiation, such as a sending DECT (Digital Enhanced Cordless Telecommunication) base station or even a running microwave oven; wherein the chargeable circuitry has been placed. Further, a handheld device may be used as an EM-radiation source, and preferably a handheld wireless device, such as a mobile telephone or a PDA (Personal Digital Assistant). In this context, a handheld device is something which is designed to be operated when held in the hand of the user without the use of a separate support. In this context, a wireless device is a device which communicates by means of emitted radiation which is e.g. airborne. Further examples of EM-radiation sources includes leak fields, e.g. from mains devices. These normally emit a weaker EM-field compared to the devices described above, and consequently it will normally take longer until the energy cell is fully charged when such a device is used.

The charging of the energy cell is typically a gradual process which is dependent on the voltage applied across the energy cell, and more specifically on the rate of the electrochemical reaction of the energy cell. In other words, the stronger the received EM-field the faster the energy cell will be charged. Hence, it is evident to the man skilled in the art that the antenna of the chargeable circuitry should preferably, but not necessarily, be adapted to the intended EM-radiation source in order to convert as much of the received EM-radiation as possible.

According to one embodiment of the invention the chargeable circuitry antenna or the energy harvesting antenna is arranged to receive a frequency band used by a mobile telephone communication system or a DECT telephone system or other EM-field communication system, e.g. a frequency band used by $2^{nd}$ or $3^{rd}$ generation mobile telephone communication systems. The antenna may for example be arranged to receive a frequency within the range of about 800 MHz to about 1,900 MHz. The antenna can also be designed for receiving EM-radiation at another frequency band, such as between about 40 to about 70 Hz, and preferably about 50 and/or about 60 Hz, i.e. the frequency which is normally used for mains devices. Naturally, there are many other suitable frequency ranges such as about 450 MHz, as well as the different frequency ranges used for CDMA, WLAN and WIFI and frequency ranges between about 1 and about 5 GHz, e.g. form about 2 GHz to about 3 GHz, preferably about 2.4 GHz or about 3.1 GHz.

According to one embodiment the EM-frequencies for RFID-applications can be used, such as from about 125 kHz to about 148 kHz, at about 13.56 MHz, at about 433 MHz, at about 915 MHz or at about 2.45 GHz.

Optionally, the EM-radiation source can be arranged within an activation unit, preferably having a flat upper surface and having a cord for connection to a wall socket for powering of the EM-radiation source. When the chargeable circuit element is to be charged it is placed in the vicinity of the activation unit, and preferably in contact with the flat surface of the activation unit. According to one specific example, an activation unit having a flat upper surface and comprising an antenna printed on a planar circuit board is used. The emitted frequency of the circuit board antenna is preferably optimised for the antenna comprised in the chargeable circuitry. Further, the surface area of activation unit preferably has about the same area as the chargeable circuit element and the activation unit is preferably less than 10 cm high, more preferred less than 5 cm high and most preferred less than 3 cm high. Moreover, the activation unit is preferably arranged to be placed on a table or the like.

For most antenna designs there is a predetermined frequency interval within which the energy transfer between the EM-source and the antenna is more efficient. However, normally energy can also be transferred at other frequencies although less efficiently. In other words, while using the same antenna frequencies between about 40 Hz and about 2000 Hz can be used for charging of the energy cell.

In order for the energy cell to receive as much energy as possible, the antenna and the energy source are preferably held within a short distance from each other. In other words, when the antenna is designed for use with high frequency radiation sources, such as $2^{nd}$ or $3^{rd}$ generation mobile telephone frequencies, classical far field conditions will usually not apply to the antenna, as the antenna is held within the near field or the extreme near field of the antenna.

Advantageously, the chargeable circuitry is designed such that the energy cell is only affected by a radiation source that is located near the chargeable circuitry, or within 10 cm or preferably within 5 cm or more preferably within 1 cm from the chargeable circuitry, such that the energy cell is not unintentionally affected by background radiation or background noise.

According to one embodiment the antenna is arranged as a half-wave dipole antenna. Advantageously, this corresponds to a design which is straight-forward to manufacture. According to another embodiment, the antenna is arranged as a half-wave folded dipole antenna. This is advantageous as it facilitates the arrangement of the antenna in a more confined way. A dipole antenna can be folded in may different ways, as is known in the art. The antenna may for example be folded with straight angles, e.g. in a meander shape. According to one example the antenna is given a meander shape or the shape of a square wave, having either a constant or varying amplitude. Optionally, one or several of the antenna folds may be obtuse, acute or rounded. According to one example, the antenna is partially or wholly arranged such that it forms one or several words, preferably cursively written such that at least a large portion the antenna is formed of continuous material. The antenna can in other words be shaped as a signature, a logotype or any visually recognisable design, which preferably is made of a continuous piece of conducting material.

The inventors have realised that any rectifying means may be used which gives a net-contribution of rectified current within the frequency range of the EM-radiation source, and which current is sufficient to charge the energy cell within a desired time span, within 10 seconds and preferably within 5 seconds and more preferably within 1 second. As an example one or several organic or inorganic diodes may be used, such that e.g. half-wave or a full-wave rectification is achieved. According to one example a voltage doubler circuit is used as a rectifying means.

According to one embodiment the electrochromic device dynamic and has reverted to its initial state at least 10 seconds after the energy source was removed or turned off.

Advantageously the rectifier is thin, below 1 mm, preferably in the range 10-100 μm such that it can easily be integrated with a thin substrate, such as paper. Provided that the received EM-radiation has a suitable frequency range, one or several printed organic semiconducting diodes may be used, which are formed e.g. as described in "50 MHz rectifier based on an organic diode" by Soeren Steudel et al, Nature Publishing Group 24, vol 4, August 2005. Alternatively, a chip type rectifier can be used which may be attached to the chargeable circuitry or the element layer by adhesion.

According to one embodiment, said circuitry is arranged of thin layers, which are arranged substantially in a common plane. This is advantageous as it facilitates the arrangement of the chargeable circuitry in or on thin substrates. Preferably, the rectifier is arranged in series with said antenna and said energy cell. According to one embodiment, at least a portion of the electric conductors which connects said rectifier to said energy cell and said antenna is formed of an organic material, and preferably of a printable organic material such as electrically conducting polymers. According to one example a first portion of the electric conductors are made of metal and second portion of the conductors are made of electrically conducting organic material, e.g. the electric conductors which connects the rectifier to the antenna is made of electrically conducting non-organic material, and the electric conductors which connects the rectifier to the energy cell are arranged of electrical conducting polymers. Alternatively, a portion of the electric conductors which connects the rectifier to the energy cell is made of metal, and another portion is made of electrically conducting organic material.

According to one example one or more of the circuit components is/are printed.

According to one embodiment, the circuitry further comprises an EC-display. Preferably the EC-display is arranged on a reflective and/or non-transparent layer, in order to enhance the visibility of the display. According to one embodiment, the layer has a matt preferably white colour, alternatively the layer has a reflective surface. Advantageously, said layer is a portion of an electric conductor, preferably a metal conductor, connecting the display to the rectifier and the antenna. According to one embodiment energy cell comprises electrochromic material, which alter its colour as the energy cell is charged. In other words the energy cell and the EC-display is one and the same electrochemical component.

According to one embodiment the EC-display comprises:
- at least one electrochromic element comprising (i) at least one material that is electrically conducting in at least one oxidation state and (ii) at least one electrochromic material, wherein said materials (i) and (ii) can be the same or different,
- a layer of a solidified electrolyte which is in ionic contact with said electrochromic element,
- at least one counter portion of electronically conducting material, spatially separated from said electrochromic element and in electrical contact with said electrolyte, and
- means for providing a voltage difference across said electrolyte.

By adjusting the voltage difference across said electrolyte, an electrochemical reaction which alters the colour of said electrochromic element may be controlled.

Preferably, said counter portion comprises electrochemically active material, such that upon application of a voltage difference between said electrochromic element and said counter portion a redox-reaction is initiated. Thus, said electrochromic material is oxidised and said counter portion is reduced, or vice versa.

In some embodiments the electrolyte is in the form of a continuous layer to which the counter layer and the electrochromic layer is connected, giving rise to a dynamic device in which establishment of said voltage difference results in a colour change that is reversed upon removing the voltage. In other embodiments of the present invention, an electrochromic display is provided in which three spatially separated portion of electrically conducting material are ionically connected to each other by a continuous electrolyte, wherein at least said middle portion is arranged of electrochromic material. The conduction of ions in this device is then interrupted, so that the application of voltage across the electrolyte results in reduction and oxidation reactions that are not reversed upon removing the voltage. Thus, bi-stable switching between states is made possible by these accumulator-like properties of such embodiments of the display.

In one embodiment, an electrochromic display is provided, wherein the electrochromic display comprises at least one further electrochromic material or where the counter portion comprises electrochromic material to complement said electrochromic material in the electrochromic element. This makes it possible to realise displays with more than one colour, with for example one colour-generating oxidation reaction and one colour-generating reduction reaction taking place simultaneously at different locations in the display. As a further example, redox reactions giving rise to different colours at the same location, but at different applied voltages, can be designed. This further electrochromic material can be provided within the solidified electrolyte or within the electrochromic element, which then for example comprises an electrochromic redox pair.

In some preferred embodiments of the invention, the electric field(s) causing the colour changes in the electrochromic element are generated in a dynamic fashion, so that displays with animated or time separated effects can be realised. According to one embodiment this is achieved by the patterning of the electrochromic material, wherein preferably narrow, electrically non-conducting portions are arranged between two electrochromic portions.

Optionally, more than one individually addressed counter portion can be used, and these can be positioned in a tailored manner so as to create animated elements in the display. Different and varying potentials can be applied to these elements, giving rise to variable electric fields in the electrolyte, by way of which animated effects can be controlled. These animated effects can be realised without the need for individually addressable pixels or segments.

According to a further embodiment, a self controlled electric circuit comprising EC-displays is arranged such that the different displays elements, which are spatially separated from each other, are automatically switched in a time separated manner. In relation to this invention a "self controlled" electric circuit means that the electric circuit exhibits a animated or time separated effects without the need for any varying control potentials. In other words, when a sufficiently high potential difference is applied to the electric circuit one EC-display element is switched at a time, such that after a predetermined time period a first display element has switched to a greater extent than the other display element(s) of the circuit.

Definitions

Electrochemically active: an "electro-chemically active" element according to the present invention, is a piece of a material comprising material having an electronic conductivity that can be electrochemically altered through changing of the redox state of said material. An electrochemically active element is normally in ionic contact with an electrolyte, and the electrochemically active element may furthermore be integrated with an electrode, being composed of the same or different materials. According to one embodiment the electro-chemically active element comprises organic material.

Electrochromic element: an "electrochromic element" in relation to this invention is a continuous geometrical body, which can be patterned to different shapes, and is composed of one material or a combination of materials. The material(s) may be organic or inorganic, molecular or polymeric. Such an electrochromic element, whether it is composed of one material or is an ensemble of more than one material, combines the following properties: at least one material is electrically conducting in at least one oxidation state, and at least one material is electrochromic, i.e. exhibits colour change as a result of electrochemical redox reactions within the material. Optionally, the electrochromic element may comprise an electrochemically active material.

Electrochromic display: an "electrochromic display" is in relation to this invention is a device comprising at least one electrochromic element, which device is arranged such that a colour change of the electrochromic element is visually detectable in reflection and/or in transmission.

Solidified electrolyte: for the purposes of the invention, "solidified electrolyte" means an electrolyte, which at the temperatures at which it is used is sufficiently rigid that particles/flakes in the bulk therein are substantially immobilised by the high viscosity/rigidity of the electrolyte and that it does not flow or leak. In the preferred case, such an electrolyte has the proper rheological properties to allow for the ready application of this material on a support in an integral sheet or in a pattern, for example by conventional printing methods. After deposition, the electrolyte formulation should solidify upon evaporation of solvent or because of a chemical cross-linking reaction, brought about by additional chemical reagents or by physical effect, such as irradiation by ultraviolet, infrared or microwave radiation, cooling or any other such. The solidified electrolyte preferably comprises an aqueous or organic solvent-containing gel, such as gelatine or a polymeric gel. However, solid polymeric electrolytes are also contemplated and fall within the scope of the present invention. Furthermore, the definition also encompasses liquid electrolyte solutions soaked into, or in any other way hosted by, an appropriate matrix material, such as a paper, a fabric or a porous polymer. In some embodiments of the invention, this material is in fact the support upon which the electrochromic device is arranged, so that the support forms an integral part of the operation of the electrochromic device.

Electrodes: "electrodes" in devices according to the invention are structures that are composed of an electrically conducting material. Further, in the context of this invention the electrodes are normally not in direct contact with the electrolyte of the energy cell or the EC-display. Instead, the electrodes are connected to e.g. a counter portion or an electrochemically active portion of the EC-display or the energy cell, which portions in turn are in direct contact with the electrolyte. The electrode and the electrochemically active portion may be made of the same material. By inducing a first potential in the electrode or wire closest to the counter portion, and a different potential in the electrode or wire closest to the electrochromic element, an electric field within the solidified electrolyte layer is created and preferably sustained for a time period long enough for the desired charging or colour changing to occur.

Layer: according to one embodiment, a chargeable circuitry has a laminate structure and consists of "layers" of different materials. These layers can be continuous or patterned, and can be applied to each other (self-supporting device) or to a support (supported device). Furthermore, the term layer is intended to encompass all of the same material in the same plane, regardless whether this material is patterned or interrupted in such a way as to form discontinuous "islands" in the plane. The chargeable circuitry preferably has a planar configuration.

Direct electrical contact: Direct physical contact (common interface) between two phases (for example counter element and electrolyte) that allows for the exchange of charges through the interface. Charge exchange through the interface can comprise transfer of electrons between electrically conducting phases, transfer of ions between ionically conducting phases, or conversion between electronic current and ionic current by means of electrochemistry at an interface between for example counter element and electrolyte or electrolyte and electrochromic element, or by occurrence of capacitive currents due to the charging of the Helmholtz layer at such an interface.

Colour change: when reference is made to "colour change", this is also meant to include changes in optical density or reflectance, so that "colour change" for example takes into account changes from blue to red, blue to colourless, colourless to blue, dark green to light green, grey to white or dark grey to light grey alike.

Materials

In the following, materials that can be used for the different components of the present invention are described and exemplified.

Electrochemically Active Material

The material may comprise a polymer that is electrically conducting in at least one oxidation state and optionally further comprises a polyanion compound. Organic materials comprising combinations of more than one polymer material, such as polymer blends, or several layers of polymer materials, wherein the different layers consist of the same polymer or different polymers, are also contemplated. Conductive polymers for use in the electrochemical timer device of the invention are preferably selected from the group consisting of polythiophenes, polypyrroles, polyanilines, polyisothianaphthalenes, polyphenylene vinylenes and copolymers thereof. At present, PEDOT:PSS (PEDOT (poly (3,4-ethylenedioxythiophene)) doped with PSS (poly (styrene sulphonate))) is found suitable and is used in a number of applications. P3HT (poly (3-hexylthiophene)) is also found useful. It is also possible to use non-organic electrochemically active materials. Examples of such materials include metal oxides such as WO3, Ni(OH)2, IrO2, Nb2O5 and MoO3.

Electrolyte

Preferably, the solidified electrolyte comprises a binder. It is preferred that this binder have gelling properties. The binder is preferably selected from the group consisting of gelatine, a gelatine derivative, polyacrylic acid, polymethacrylic acid, poly(vinylpyrrolidone), polysaccharides, polyacrylamides, polyurethanes, polypropylene oxides, polyethylene oxides, poly(styrene sulphonic acid) and poly (vinyl alcohol), and salts and copolymers thereof; and may optionally be cross-linked. The solidified electrolyte preferably further comprises an ionic salt, preferably magnesium sulphate if the binder employed is gelatine. The solidified electrolyte preferably further contains a hygroscopic salt such as magnesium chloride to maintain the water content therein.

Electrochromic Element

In preferred embodiments, an electrochromic element comprises, as electrochromic material, an electrochromic polymer which is electrically conducting in at least one oxidation state, and optionally also comprises a polyanion compound. Electrochromic polymers for use in the electrochromic element of the electrochromic device of the invention are preferably selected from the group consisting of electrochromic polythiophenes, electrochromic polypyrroles, electrochromic polyanilines, electrochromic polyisothianaphthalenes, electrochromic polyphenylene vinylenes and copolymers thereof, such as described by J C Gustafsson et al in Solid State Ionics, 69, 145-152 (1994); Handbook of Oligo- and Polythiophenes, Ch 10.8, Ed D Fichou, Wiley-VCH, Weinhem (1999); by P Schottland et al in Macromolecules, 33, 7051-7061 (2000); Technology Map Conductive Polymers, SRI Consulting (1999); by M Onoda in Journal of the Electrochemical Society, 141, 338-341 (1994); by M Chandrasekar in Conducting Polymers, Fundamentals and Applications, a Practical Approach, Kluwer Academic Publishers, Boston (1999); and by A J Epstein et al in Macromol Chem, Macromol Symp, 51, 217-234 (1991). In a preferred embodiment, the electrochromic polymer is a polymer or copolymer of a 3,4-dialkoxythiophene, in which said two alkoxy groups may be the same or different or together represent an optionally substituted oxy-alkylene-oxy bridge. In the most preferred embodiment, the electrochromic polymer is a polymer or copolymer of a 3,4-dialkoxythiophene selected from the group consisting of poly(3,4-methylenedioxythiophene), poly(3,4-methylenedioxythiophene) derivatives, poly(3,4-ethylenedioxythiophene), poly(3,4-ethylenedioxythiophene) derivatives, poly(3,4-propylenedioxythiophene), poly(3,4-propylenedioxythiophene) derivatives, poly(3,4-butylenedioxythiophene), poly(3,4-butylenedioxythiophene) derivatives, and copolymers therewith. The polyanion compound is then preferably poly (styrene sulfonate). As is readily appreciated by the skilled man, in alternative embodiments of the invention, the electrochromic material comprises any non-polymer material, combination of different non-polymer materials, or combination of polymer materials with non-polymer materials, which exhibit conductivity in at least one oxidation state as well as electrochromic behaviour. For example, one could use a composite of an electrically conducting material and an electrochromic material, such as electrically conductive particles such as tin oxide, ITO or ATO particles with polymer or non-polymer electrochromic materials such as polyaniline, polypyrrole, polythiophene, nickel oxide, polyvinylferrocene, polyviologen, tungsten oxide, iridium oxide, molybdenum oxide and Prussian blue (ferric ferrocyanide). As non-limiting examples of electrochromic elements for use in the device of the invention, mention can be made of: a piece of PEDOT-PSS, being both conducting and electrochromic; a piece of PEDOT-PSS with $Fe^{2+}/SCN^-$, PEDOT-PSS being conducting and electrochromic and $Fe^{2+}/SCN^-$ being an additional electrochromic component (see below); a piece composed of a continuous network of conducting ITO particles in an insulating polymeric matrix, in direct electrical contact with an electrochromic $WO_3$-coating; a piece composed of a continuous network of conducting ITO particles in an insulating polymeric matrix, in contact with an electrochromic component dissolved in an electrolyte.

As described above, an electrochromic display may comprise a further electrochromic material for realisation of displays with more than one colour. This further electrochromic material can be provided within the electrochromic element or the solidified electrolyte, which then for example comprises an electrochromic redox system, such as the redox pair of colourless $Fe^{2+}$ and $SCN^-$ ions on one hand, and of red $Fe^{3+}$ $(SCN)(H_2O)_5$ complex on the other. By way of further, non-limiting example, such materials may be selected from different phenazines such as DMPA-5,10-dihydro-5,10-dimethylphenazine, DEPA-5,10-dihydro-5,10-diethylphenazine and DOPA-5,10-dihydro-5,10-dioctylphenazine, from TMPD—N,N,N',N'-tetramethylphenylenediamine, TMBZ—N,N,N',N'-tetramethylbenzidine, TTF—tetrathiafulvalene, phenanthroline-iron complexes, erioglaucin A, diphenylamines, pethoxychrysoidine, methylene blue, different indigos and phenosafranines, as well as mixtures thereof.

BRIEF DESCRIPTION OF THE DRAWINGS

FIG. 1a is a top view which schematically illustrates an emitter of EM-radiation and a chargeable circuitry according to one embodiment of the invention.

FIG. 1a' is a schematic top view of a chargeable circuitry according to an embodiment the invention.

FIGS. 2a-2f schematically illustrate different antenna configurations, which are suitable for use in a chargeable circuitry as described in relation to FIG. 1a.

FIG. 3a is a top view which schematically an arrangement of an energy cell.

FIGS. 3b-3d' are schematic side views of different arrangements of an energy cell for use in a chargeable circuitry.

FIG. 4b is a symbol, which denotes the energy cell described in relation to FIG. 4a.

DETAILED DESCRIPTION OF THE INVENTION

Figure 2E:
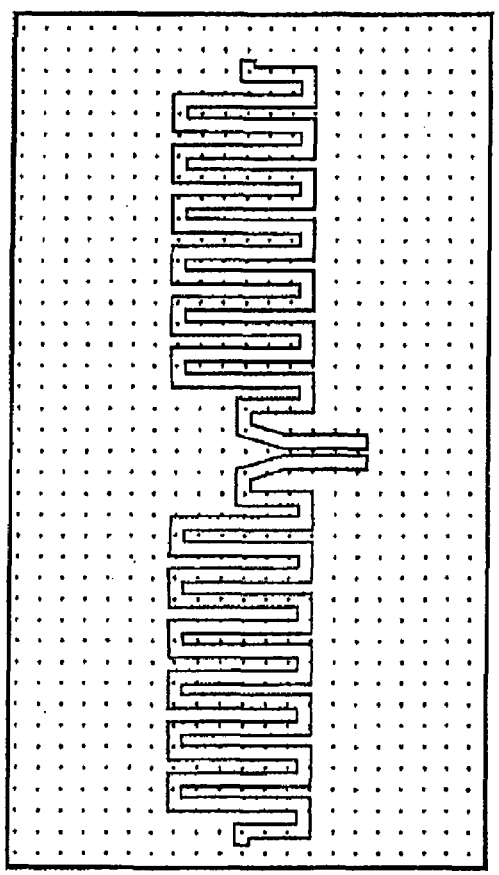

FIG. 1a is a schematic top view illustrating an emitter of electromagnetic radiation 190, and a chargeable circuitry 100 according to one embodiment of the invention, the circuitry 100 is enclosed by a dashed line. The circuitry 100 is arranged to receive and convert at least a portion of the emitted electromagnetic radiation for activating an energy cell or a battery 130 comprised in said circuitry 100. The circuitry additionally comprises an antenna or energy harvesting device 110 and a rectifier 120. The three components 110,120,130 are electrically connected in series such that the rectifier is coupled to and arranged in series between the antenna 110 and the energy cell 130; and the energy cell 130 is coupled to and arranged in series between the antenna 110 and the rectifier 120. The antenna 110 is arranged to convert received electromagnetic radiation into electric current; the rectifier 120 is arranged to receive said electric current and to convert it into a rectified current; and the energy cell is arranged to receive said rectified current and to change redox state in response thereto. Although the rectifier 120 is illustrated as a diode, any rectifying means can be used which provides a sufficient net contribution as described above. For instance, a suitable diode bridge or voltage doubler circuit may be used.

FIG. 1a' is a photo of an chargeable circuit 100' as described in relation to FIG. 1A, having a planar configuration, wherein an energy cell 130' and a diode 120' are arranged inside a coil antenna 110'. A coil antenna normally has the advantage of providing more energy to the circuit compared to a half wave dipole antenna.

FIGS. 2a-d schematically illustrate different antenna arrangements. The point of connection to the rectifier and the energy cell, respectively, is indicated by two dots 211, 212 in the respective FIGS. 2a-2d'. As described above the length of the antenna is preferably, but not necessarily, arranged such that the antenna 210a is a half wave dipole. With reference to FIG. 2a, the antenna consists of two straight lines of conducting material e.g. copper or conducting polymers. According to an alternative embodiment, FIG. 2b, the antenna 210b corresponds to a half wave folded dipole antenna. According to yet an alternative embodiment, FIG. 2c, the antenna 210c corresponds to a folded dipole antenna having a meander folding with varying amplitude. Optionally, the meander antenna may have a constant amplitude. According to yet another alternative embodiment, FIGS. 2d and 2d', the antenna has a continuous but not regular shape and illustrates for example cursively written word(s). Alternatively, the antenna may be arranged as a coil antenna, as schematically illustrated in FIG. 1a'. In essence, the antenna can be given any shape as long as it is capable of harvesting enough energy to charge the energycell within a desired time limit.

Figure 2F:
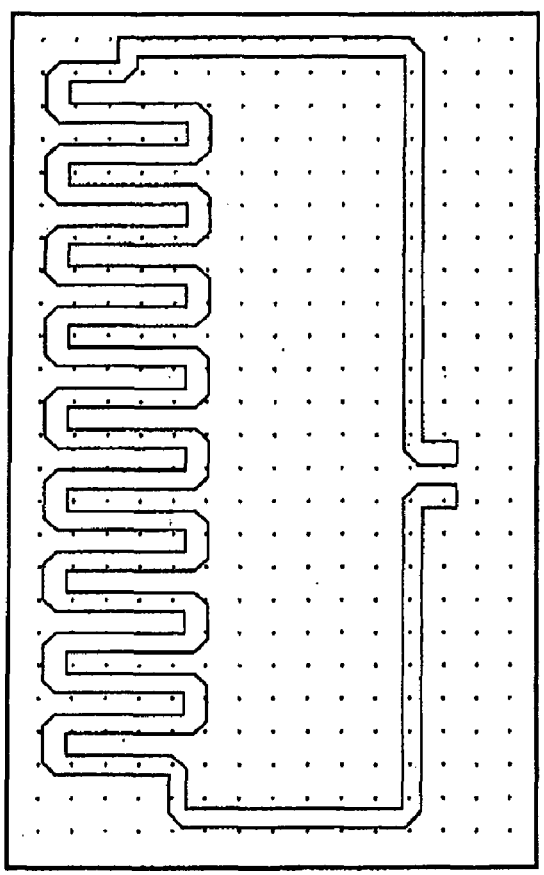

FIGS. 2e and 2f represents two antenna arrangements which are drawn to scale, and wherein the shortest distance between two dots corresponds to 1 mm. The antennas can be used over a wide frequency range, but is particularly suitable for a far-field situation at a frequency of about 900 MHz. FIGS. 2e and 2f illustrate a dipole antenna and a folded dipole antenna, respectively.

FIG. 3a illustrates a basic element of an electrochemically active energy cell 330'. The element comprises a first portion 334 of electrochemically active, a counter portion or a second portion 335 of preferably electrochemically active material and a solidified electrolyte 336, which is arranged between, partially covers and ionically connects said first portion 334 and said second portion 335. The surface of said first portion, which is covered by electrolyte 336, corresponds at least substantially to the area in which a change of redox state is desired. The change of redox state is not strictly confined to the area which is covered by the electrolyte, but may propagate somewhat into the uncovered area. The electrochemical reaction, and hence the change of redox state normally starts at the edge closest to the second portion 337. Optionally, the electrolyte may cover a larger area compared to the area of desired redox state change, provided that the electrochemical reaction is interrupted before the change of redox state has spread undesirably far. Preferably, the electrolyte covers a sufficiently large area of the second portion 335, such that enough material can be reacted to balance, by a trans-port of ions in the electrolyte, the reaction of the first portion 334. In operation, when a sufficient voltage difference is applied across said electrolyte 336 e.g. by applying a first voltage to said first portion 334 and a second voltage to said second portion, an oxidation or reduction of said electrochromic portion is effected. Optionally, a corresponding electrochemical reaction occurs at said second portion 335. In other word, if said first portion 334 is oxidised, said second portion 335 is preferably reduced, and vice versa. Optionally, the material to which said first portion is ionically connected by said electrolyte, here the second portion, is not electrochemically active.

FIG. 3b is a schematic side view an alternative lateral arrangement of the energy cell, wherein a first electrochemically active element 334 and a second electrochemically active element 335 are arranged beside each other, and sandwiched between an electrolyte 336 and a substrate 332. Moreover, the two electrochemically active elements are separated by a portion of electrolyte. This arrangement, as well as in the arrangement described in relation to FIG. 3a, are referred to as lateral as the main ion transport occurs in the lateral direction of the component. In a lateral energy cell the main ion trans-port normally occurs from a first surface of an electrochemically active element to a second surface of an electrochemically active element, where the two surfaces faces substantially the same direction.

FIG. 3b' is a schematic side view of an alternative lateral arrangement, equal to the one described in relation to 3b, except that the volume of one of the electrochemically active elements is made substantially larger compared to the other in order to prevent irreversible oxidation or reduction of that element. Here, the surface are of one of the lager electrochemically active elements 334 is made sufficiently thick such that it is not irreversible reacted, even when the smaller electrochemically active element 335 is fully reacted. According to one example both elements 334, 335 are arranged of PE-DOT:PSS, and the element 334 which is to be oxidized is made substantially larger compared to the element 335 which is to be reduced, such that the risk of an irreversible oxidation or over oxidation of the first element is minimized or eliminated. The suitable volume ratio between the first and second elements depend on the materials used. The volume of the first element 334 may e.g. be three times lager, or 5 times larger compared to the second element 335. The thickness of the first and the second elements are preferably equal.

FIG. 3c is a schematic side view a vertical arrangement of the energy cell, wherein an electrolyte 336 is sandwiched between a first electrochemically active element 334 and a second electrochemically active element 335. This arrangement is referred to as a vertical arrangement as the main ion transport occurs in the vertical direction of the component. In a vertical energy cell the main ion transport normally occurs from a first surface of an electrochemically active element to a second surface of an electrochemically active element, where the two surfaces substantially faces each other.

As schematically illustrated in FIG. 3c', the volume ratio of the first and the second electrochemically active elements 334, 335 in the vertical arrangement may be equal, or arranged as described in relation to FIG. 3b'. Preferably, the surface area of said first and second elements are equal, while the thickness of said first element 334 is substantially larger compared to the thickness of the second element 335 to prevent irreversible oxidation or reduction.

FIG. 3d is a schematic side view of a component arranged as described in relation to FIG. 3c or 3c', except that a portion of at least one of said first and second elements extends besides the other element. In other words, when viewed from the top a respective portion of both elements is visible. Preferably, at least one of said elements are arranged of electrochromic material. This is advantageous as it facilitates a visual determination of the extent to which the energy cell has been charged. For instance, said first and second element is selected such that they are substantially equal in colour in an uncharged state. Further, at least one of the elements is electrochromic, such that its colour is altered as its redox state changes. Hence, by comparing the colour differences between the two elements, the extent to which the energy cell is charged can be determined. In this embodiment the electrolyte is preferably transparent or semi-transparent.

According to one embodiment the volume and surface area of said first and second elements are equal, as illustrated in FIG. 3d'. Further, said first element is off-set in the lateral direction compared to said second element. Moreover, the electrolyte is preferably arranged such that it covers the whole of a respective surface area of both said first and said second element. Also in the embodiments described in relation to FIGS. 3d and 3d' the volume of one of said first and second elements may be sufficiently larger as a precaution against irreversible oxidation or overoxidation.

Generally, a vertical component will be charged faster as the average ion path length from one of the electrochemically active elements to the other is shorter.

According to one embodiment the first and the second electrochemically active elements are formed of the same material, e.g. both comprising PEDOT:PSS, this is sometimes referred to as an symmetric energy cell. According to an alternative embodiment said first and the second electrochemically active elements are formed of different materials, said first element may e.g. be arranged of a material comprising PEDOT:PSS and said second element of a material comprising PANI.

Figure 4A:
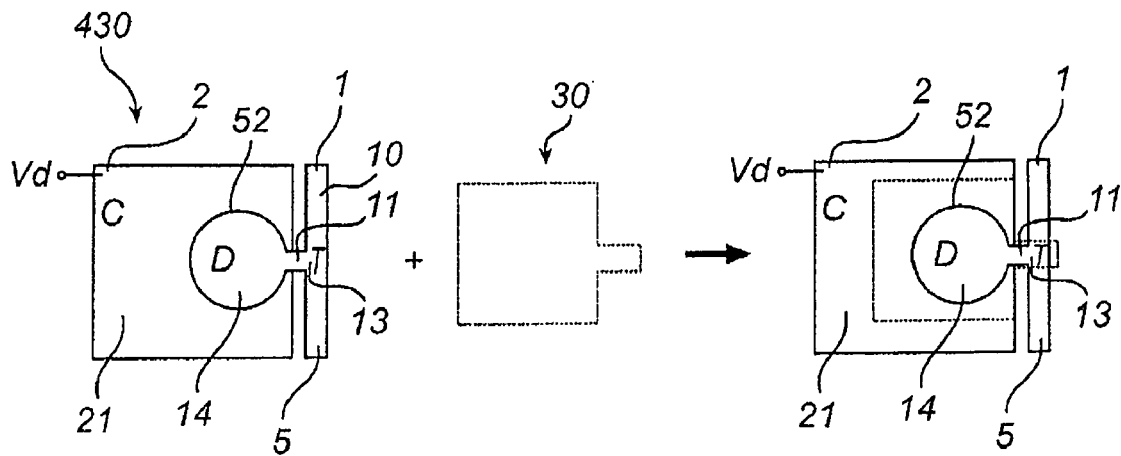
FIG. 4a is a top view which schematically illustrate another embodiment of an energy cell.

FIG. 4a illustrates one embodiment of a energy cell according to the present invention. The energy cell comprises an electrochemically active layer or a first layer 10 which is electronically connected to a source electrode 1, and a drain electrode 5. Which of the electrodes that is source electrode and drain electrode, respectively, is strictly speaking determined by the applied potentials. Said electrochromic layer also comprises a control portion or switch portion 13 spatially and electronically arranged between said source and drain electrodes 1,5. The control portion is arranged such that when it is electrochemically reacted its electrical conductivity is either increased or decreased. Hence, a current between said electrodes 1,5 can be controlled by electrochemically reacting the control portion 13. According to one embodiment said electrochromic layer has an elongated shape which extends between said source drain electrodes 1,5. A second layer or a counter layer 21 is arranged adjacent to and electronically separated from said electrochromic layer, and a solidified electrolyte 30 is arranged such that it ionically connects said counter layer 21 to said first layer 10 and the switch portion 13 thereof. Said electrolyte layer preferably covers said electrochromic layer 10, and is in direct physical contact therewith. Moreover, said counter layer is electronically connected to a gate electrode 2. The electrodes 1,2,5 may be arranged of any conducting material.

Said electrochromic layer further comprises an active portion 14. The active portion can have any 2D-shape, e.g. the shape of a symbol such as a dot, disc or a star, which active portion 14 is arranged between said switch portion 13 and said counter layer. Said counter layer 21 preferably embraces or partially surrounds said active portion 14, such that a homogenous change of redox state of said active portion 14 may be achieved. Optionally, said active portion 14 is electronically connected to said control portion by a bridging portion 11. In other words, said first portion 10 may comprise an active portion 14, a control portion 13 and a bridging portion 11, which bridging portion electronically connects said control portion 13 to said active portion 14.

According to one embodiment, the electrolyte 30 is arranged such that it ionically connects said first portion and second portions 14,21, and covers said active, bridging and control portions 14,11,13. When a suitable potential is applied across said electrolyte 30, by e.g. effecting a first potential at said gate electrode 2, and a second potential at said source electrode 5, an electrochemical reaction is initiated which changes the color and increases the resistance of said active portion 14. The electrochemical reaction is normally initiated in the part of said first portion 14, which is closest to said second portion. Thus, a front of the electrochemical reaction starting at the isolation means 52 spreads towards the bridging portion 11. By extending the length of the bridging portion, the time until the control portion switches will be increased, and vice versa.

According to one embodiment, the active portion is arranged of electrochromic material, such that the change of redox state—and hence the amount of charge stored—can be observed via the color of the electrochromic material. According to yet one embodiment the active portion 14 preferably has a geometrical shape corresponding to a predetermined symbol which is to be displayed, e.g. a disc or a star. The geometrical shape is preferably defined by said isolation means 52. Moreover, it is not necessary that the bridging portion is electrochromic, just that the front of the electrochemically reaction is allowed to propagate therein.

According to one example the energy cell 430 is preferably manufactured by providing one continuous layer which is electronically conducting, electrochemically active and possibly electrochromic. This material forms a preferably rectangular main portion, an elongated wiring portion, and a bridging portion 11, which connects said main portion to said wiring portion. The wiring portion forms said control portion 13 as well as said source and drain electrodes 1,5. An overoxidized continuous uncrossed line 52 may be arranged in said main portion, starting and ending at said bridging portion, such that it divides said main portion in said active portion 14 and said second portion 21, i.e. in two electronically separated portions. Thereafter, an electrolyte is provided which covers at least said active portion 14, said bridging portion 11, said control portion 13, and preferably an at least equally large area of said second portion 21.

Figure 4B:
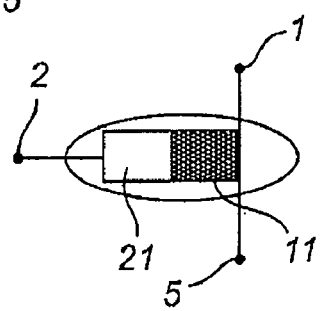

FIG. 4b corresponds to a proposed symbol for use in circuitry diagrams, corresponding to the right most device illustrated in FIG. 4a.

Figure 4C:
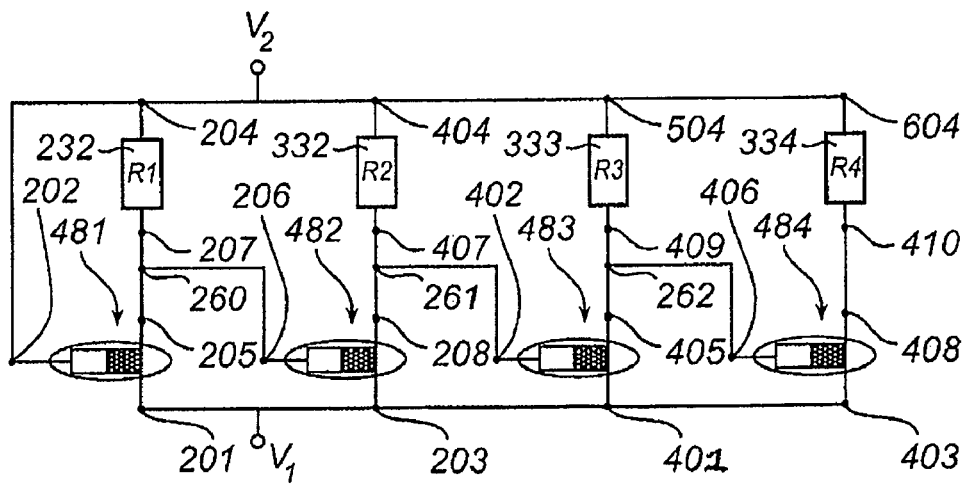
FIG. 4c is a circuit diagram, describing an arrangement whereby four separated energy cell elements, each arranged as described in relation to FIG. 4a, is switched in a time separated manner.

FIG. 4c schematically illustrates a circuit diagram wherein four energy cells are charged or switched in a time separated and sequential manner, such that the redox state of a first energy cell 481 is substantially altered before the redox state of a second energy cell 482, the redox state of which is substantially altered before the redox state of a third energy cell 483, the redox state of which is substantially altered before the redox state of a fourth energy cell 484 is altered in the same way. According to one embodiment, each of the energy cells are arranged as described in relation to FIG. 4a.

The drain electrode 205 of said first energy cell 281 and the gate electrode 206 of said second energy cell 282 are connected to a first contact portion 207 of a first resistance means 232, such that a first interface 260 is provided. Said first resistance means 232 is arranged between a first contact portion 207 and a second contact portion or a second electrode 204.

A drain electrode 208 of said second energy cell 282, and a first contact portion 407 of a second resistance means R2 are both electronically connected to a gate electrode 402 of said third energy cell 483, such that a second interface is provided 261. Further, a drain electrode 405 of said third energy cell 483, and a first contact portion 409 of a third resistance means 333 are both electronically connected to a gate electrode 406 of said fourth energy cell, such that a third interface is provided 262.

Four respective first potentials, are applied to a respective source electrode 201;203;401;403 of said energy cells 481, 482,483,484. Four respective second potentials are applied to a respective second contact portion 204;404;504;604 of said resistance means 232;332;333;334. Further, a third potential is applied to the gate electrode 202 of said first energy cell 281.

Said potentials and said resistance means are preferably arranged such that in an initial state the potential drop is smaller between said first interface 260 and said first electrode 201, compared to the potential drop between said first interface 260 and said third electrode 203. Further, the potential drop between said first and second electrodes 201, 202 is preferably lower compared to the potential drop between said third and fourth electrodes 203,204. The other energy cells are arranged in a corresponding manner. Hence, initially the electrochromic material 10 of said first energy cell 281 is electrochemically reacted to a larger extent and at a higher rate, compared to the electrochromic material of respective second, third and fourth energy cell 482, 483, 484. The electrochemical reaction changes or alters the redox state and increases the resistance of the switch portion 11 of said first energy cell 481. Due to this increased resistance the potential at said first common interface 260 will increase, and more charge carrier will flow between said first common interface 260 and the electrochromic layer of said second energy cell 482. Eventually, this will increase the resistance between said source and drain electrodes of said second energy cell 482, such that a change of redox state or charging of said third energy cell will be effectuated. Later yet, the resistance between said source and drain electrodes of said third energy cell 483 is increased sufficiently due to yet another electrochemical reaction, such that a change of redox state or charging of said fourth energy cell will occur.

According to an alternative embodiment all or some of said resistance means R1-R4 are substantially equal in resistance, some or all of said source electrodes 201,203,401,403 are connected to a first common potential V1, and/or some or all of said second contact portions 204, 404, 504, 604 are connected to a second common potential V2. The gate electrode 202 of said first energy cell 481 is preferably connected to said second common potential V2.

Suitable potential differences and resistance values of the resistance means are determined by the materials used for said energy cells. In other words, below parameter values are given for one specific configuration of the display. These values shall be regarded as non-limiting examples with respect to the scope of the claims, and the skilled man would, in view of the description the examples given, have no difficulties in choosing other suitable parameter values for the components of the chargeable circuit.

According to one example said electrochemically active material is PEDOT:PSS. Said layer of solidified electrolyte comprises an organic polymer in combination with a conductivity enhancing component i.e. a salt as well as surfactant, wetting and film forming agents, and the electrolyte is arranged on top and in physical contact with said sheet of electrochemically active material. Further, the value of the respective resistance R1-R4 is about 150 kOhm, and in the unreacted state the resistance between the gate and source electrodes of each energy cell is about 1 MOhm and the resistance between the drain and source electrodes of each energy cell is about 3 kOhm. In other words, if the potential difference is approximately 5 V, the potential at 260 is initially about 0.1 V. At a fully switched or charged state the resistance between said source and drain electrodes (R-channel) is 680 kOhm, when the applied potential (V2-V1) is 5 V. Further, the potential at the interface 260 (P-260) is 4.1 V. The resistance of R1-R4 remain substantially the same.

The resistance between the source and drain electrodes at a fully charged state is dependent on the applied potential difference (V2-V1) in the following manner for the specific example described above:

| V2-V1 | P-260 | R-channel (fully switched) |
|---|---|---|
| 5 V | 4.1 V | 680 kOhm |
| 4 V | 3.1 V | 515 kOhm |
| 3 V | 2.1 V | 350 kOhm |
| 2 V | 1.1 V | 180 kOhm |

Normally, a potential difference of 0.5 V is needed in order to effectuate the electrochemical reaction.

Figure 4D:
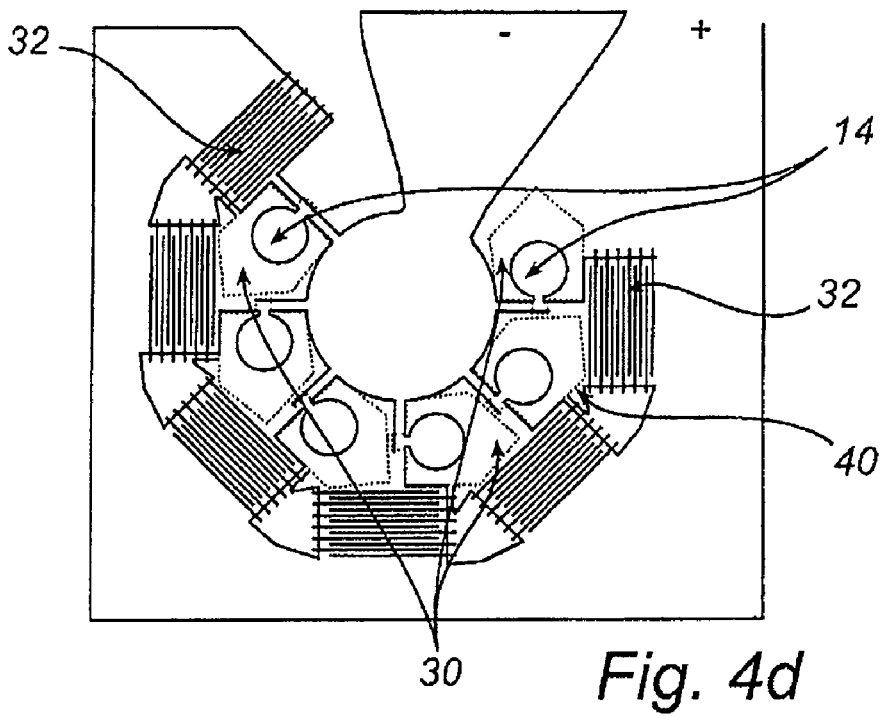
FIG. 4d is a schematic top view of one practical embodiment which implements the principles described in relation to FIG. 4c.

FIG. 4d is a top view which schematically illustrates a practical example of how several energy cells of the type described in relation to FIG. 4a can be electrically connected to each other, as described in relation to FIG. 4c, that such a time separated charging is provided. This example comprises six energy cells, wherein the two additional energy cells and two resistance means are arranged as continuations or repetitions of a portion of the circuitry shown in FIG. 4c. The resistance means and the chargeable portions are defined by lines cut by a knife in a continuous layer of electronically conducting and electrochemically active material. These cuts are indicated by lines in FIG. 4d. Note that the outline of applied portions of electrolyte is indicated as dashed polygonals. Six resistance means are arranged as meanders defined by said straight lines. The first and sixth meander are indicated by a respective arrow 32. A first and sixth active portion are indicated by a respective arrow 14. A first, fourth and sixth electrolyte are indicated by a respective arrow 30. Each electrolyte covers a respective active portion, bridging portion and control portion, as well as a portion of the surrounding counter layer, in a respective energy cell.

A negative potential is applied to a portion of said continuous electrochromic layer which is an extension of the source portion or source electrodes of said energy cells. A positive potential is applied to a portion of said continuous layer which is and extension of with said counter portions or said gate electrodes. The potential difference between said negative and positive voltage is, according to one embodiment, about 5 V. While the voltage is applied, one energy cell is charged at a time with a time difference of about 1 second, provided that the voltage is high enough.

As the voltage is removed, all the energy cells de-charge, due to a reversed electrochemical reaction. If the voltage is turned on again, the energy cells will again switch in a time separated manner.

The above described energy cells are only examples which can readily be amended and combined to provide a desired function of the chargeable circuit.

Figure 5A:
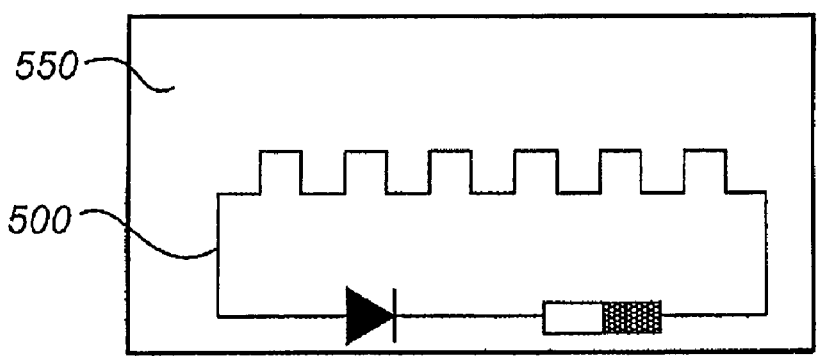
FIGS. 5a and 5b are schematic top views of a target device provided with chargeable circuitry, and a chargeable circuit element, respectively.

FIG. 5a illustrates a chargeable circuitry 500 arranged as described in relation to FIG. 1a, which is provided in or on a the a target device 550. The circuitry can be arranged anywhere on the device by means of e.g. printing and/or adhesive techniques. According to one embodiment the circuitry occupies a major portion of the target device, according to an alternative embodiment the circuitry less than a quarter, and more preferred less than 10% of the target device. As stated above, the surface of the target device in or on which the circuit is arranged can be a top layer or an intermediate layer, which layer is visible or hidden by e.g. an additional layer.

According to one embodiment the target device is fully completed before the circuitry is applied, according to an alternative embodiment the chargeable circuitry is applied before the manufacturing of target device is fully completed.

Figure 5B:
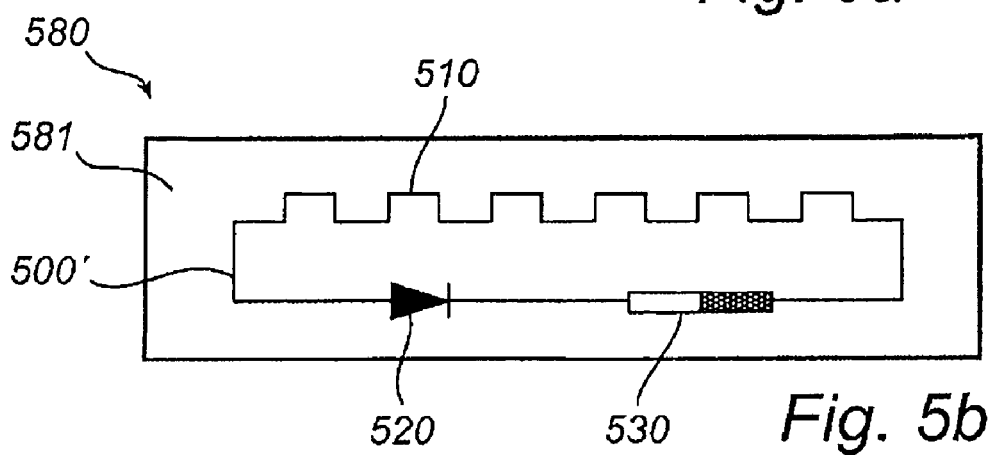

Alternatively, the chargeable circuitry may be arranged on a carrier, which is later integrated in or on a target device. FIG. 5b is a schematic illustration of a chargeable circuit element 580 comprising a chargeable circuitry 500', which is arranged on a carrier 581. According to this embodiment, an antenna 510, a rectifier 520 and an energy cell 530 is arranged on a first layer 581 of the chargeable circuit element. The circuitry and the energy cell may be arranged according to any of the embodiments described above.

Moreover, several chargeable circuitries may be arranged on the same target device, either by being attached directly on the target device as described in relation to FIG. 5a or by first being provided on a carrier layer comprised in a chargeable circuit element as described in relation to FIG. 5b, which element is later integrated with a target device.

Figure 6A:
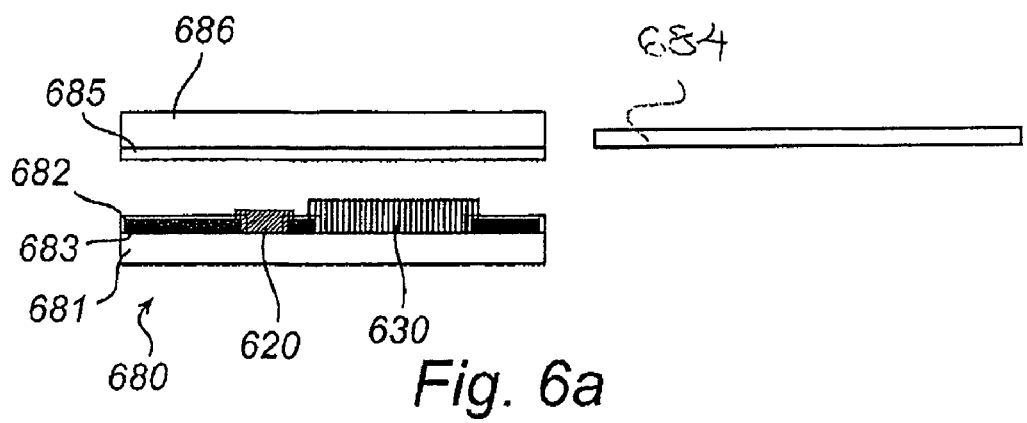
FIGS. 6a and 6b are schematic side views of different ways to manufacture the chargeable circuit element.

According to one method of producing the inventive chargeable circuit a carrier or a first chargeable circuit layer is provided, whereon a chargeable circuit arranged as described in relation to FIG. 1 is provided. FIG. 6a schematically illustrates a side view of this arrangement. According to this embodiment a first chargeable circuit layer 681 is arranged of a polypropylene layer having a thickness of between 15-25 μm, and which is coated with a layer of aluminium foil 683 having a thickness of between 5-10 μm. The antenna and the conductors of the chargeable circuitry is formed by removing appropriate portions of the aluminium foil 683. Optionally, the aluminium layer is coated with a anti-corrosion protective layer 682 preferably having a thickness of between 1-5 μm. Additionally, a rectifier 620 is attached to the chargeable circuit layer 681 and the subtractivly formed aluminium conductors, in electrical contact with the antenna. Thereafter an energy cell 630 is provided on the first chargeable circuit layer 681 by printing at least one segment of electrochemically active material, such that one or two of the segments is/are in electric contact with at least two portion of said aluminium conductors. Optionally, the chargeable circuit 680, is covered with an additional layer of polypropylene 686 having a thickness between 15-20 μm; or a protection layer, such as an over-varnish layer 684 having a thickness of between 3-10 μm. The additional polypropylene layer 686 is preferably provided with an adhesive coating 685, having a thickness of 1-5 μm, in order to facilitate the attachment of the polypropylene layer to said first chargeable circuit element layer and/or the components thereon.

Figure 6B:
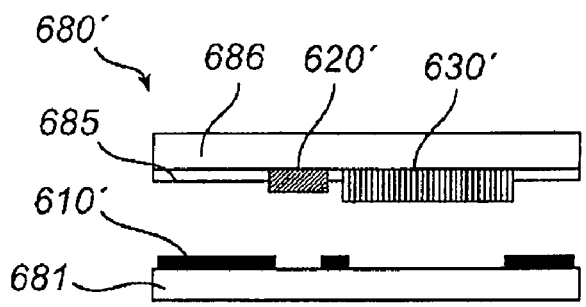

FIG. 6b schematically illustrates a side view according to another embodiment of the manufacturing method. The difference between this method and the method described in relation to FIG. 6a, is that the rectifier 620' and the energy cell 630' are arranged on a second chargeable circuit element layer 686. The second chargeable circuit element layer is preferably a plastic or paper based substrate, e.g. a polypropylene substrate having a thickness of between 15-25 μm, preferably about 20 μm. The rectifier and energy cell may be provided on the second layer by an additive method. Optionally, said second layer may further be provided with an adhesive layer 685 having a thickness between 1-5 μm, in order to facilitate attachment to said first layer and/or the components thereon. Thereafter, the first and second chargeable circuit element layers are attached to each other, by means of known techniques, in such a way that electrical contact is provided between said rectifier 620 and the antenna 610', between the energy cell 630' and the rectifier 620', and between the antenna 610' and said energy cell 630'. Alternatively, said first and second chargeable circuit element layer 681, 686 each comprises a portion of a component, e.g. the rectifier, which portions are arranged such that the desired rectifying capability is formed once the two layers are attached to each other.

According to one embodiment there are six energy cells visibly arranged in a row on a target device, wherein the electrochemical active element of each energy cell is arranged of electrochromic material. Once an energy source, such as an sending antenna of a mobile telephone is brought in the vicinity of the chargeable circuit, e.g. at a distance of 1-6 cm from the antenna of the chargeable circuit, the EM-field of the antenna is sufficient to charge the energy cells e.g. in a time separated manner. Alternatively, all energy cells can be charged without an intermediate delay.

When the chargeable circuit is arranged e.g. as described in relation to FIG. 6a, and the active portions of the energy device comprises electrochromic material, the charge level of the energy circuit can be determined by the number of active portions which have changed colour.

Figure 7:
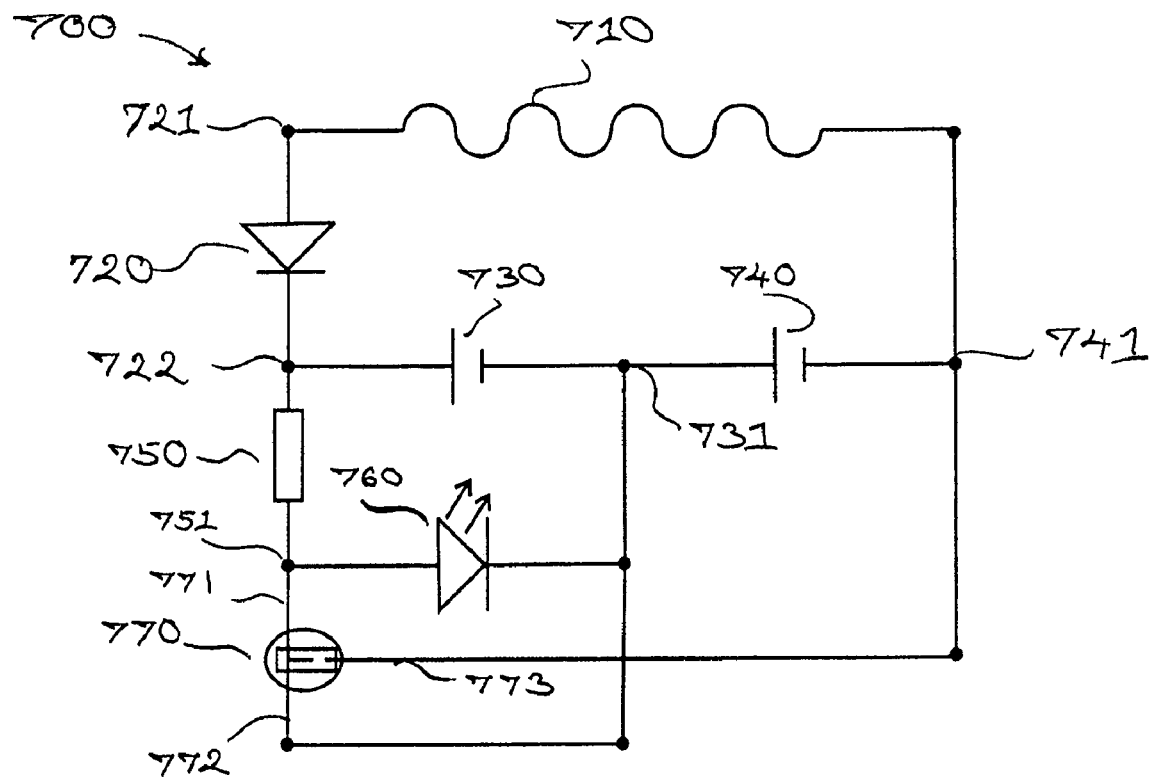
FIG. 7 schematically illustrates one example of a circuitry wherein a component is powered by energy stored in the de-chargeable energy cell.

FIG. 7 illustrates a circuitry 700 in accordance with the invention which comprises an antenna 710 arranged to receive EM-radiation from an energy source (not shown). The antenna may be arranged as described in relation to FIG. 2. The circuitry further comprises a diode 720, which is arranged to rectify a current received from said antenna 710, and to supply said rectified current to a first and a second de-chargeable energy cell 730, 740, arranged as described above. Said first and second energy cells 730, 740 are arranged to receive and convert said rectified current into stored energy, by altering their respective electrochemical states in response to said rectified current. Said first energy cell 730 is further arranged to supply the stored energy to an electrical component 760, which electrical component is arranged to receive energy from said energy cell and to be activated or alter its state in response thereto. Additionally, the circuit comprises control means 770 arranged to direct the energy stored in said energy cells 730, 740 to said electric component 750 at a predetermined instance. Typically, the control means 770 is arranged to restrain the amount of current which is supplied to the electrical component 760 until a predetermined event has occurred. In other words the control means 770 may be arranged to increase the portion of the stored energy which is directed to the electric component a predetermined time after the charging of the energy cells 730, 740 has been initiated, or after a predetermined amount of current has reached said control means.

In more detail, the circuit comprises an antenna 710, which is arranged to received EM-radiation from an energy source (not shown). The circuit further comprises a diode 720 as well as a first and a second re-chargeable energy cell 730, 740. The antenna 710, the diode 720 and the energy cells 730, 740 are all arranged in series, such that the diode 720 is arranged between said antenna 710 and said first energy cell 730; the first energy cell 730 is arranged between said diode 720 and said second energy cell 740, and said second energy cell 740 is arranged in series between said first energy cell 730 and said antenna 710. Further, resistance means 750 and a light source 760 is arranged in parallel with said first energy cell 730, wherein said resistance means 750 and said light source 760 are arranged in series between said diode 720 and said second energy cell 740. Additionally, a source and a drain portion 771, 772 of a timer element or control means 770 are arranged in parallel with said light source 760, as well as in series between said resistance means 750 and said second energy source. Further, said source 771 and a gate portion 773 of said timer element 770 is arranged in series between said resistance means 750 and said antenna 710.

In other words, the circuit comprises an antenna 710, a first portion of which is electronically connected to a first portion of a diode 720, such that a first interface 721 is provided. A second portion of said diode 720, a first portion of a resistance means 750 are electrically connected to a first portion of an energy source 730, such that a second interface 722 is provided. A second portion of said resistance means 750, a first portion of said light source 760 is connected to a first portion of a timer element 770, such that a third interface 751 is provided. A second portion of said timer element 770, a second portion of said light source 760, and a second portion of said first energy cell 730 is electrically connected to a first portion of a second energy cell, such that a fourth interface 731 is provided. A third portion of said timer element 770 and a second portion of said second energy cell 740 is electrically connected to a second portion of said antenna 712, such that a fifth interface 741 is provided.

Typically, the energy cells are initially in a de-charged or partly de-charged state. By feeding the antenna 710 with an EM-field, which is rectified by the diode 720, the energy cells 730, 740 are charged with energy. In its active state the control means 770 is arranged such that no or substantially no current will reach the light source 760 until after a predetermined time, when the timer element has changed from an active state to an inactive state. The change of states of the timer element is normally set to occur after the batteries have been charged to a desired level and the EM-source has stopped feeding the antenna with energy. According to one example, when the timer element 770 is in its active state the difference in impedance is be substantially larger across the resistance means 750 compared to across the timer element 770, e.g. more than 10 times or more than 100 times larger. Further, when the control means is in its inactive state its impedance is raised such that the impedance across the timer element now is substantially larger than across the resistance means, e.g. more than 10 times or more than 100 times larger. Thus, now a larger portion of the current reaches the light source. This amount of current is enough to power the component. The control means may be any component which is able to control the amount of current supplied to the light source. According to one embodiment the control means is an electrochemical timer, e.g. of the type described in EP 1 720 188 A9. FIG. 1A-C of EP 1 720 188 illustrates suitable configurations of the control means or timer element, and the operation principle is e.g. described in relation to FIG. 3 of EP 1 720 188. In other words, once a front of an electrochemical reaction, which propagates within the delay reservoir, reaches the channel portion, the electrochemical reaction effects a decrease in the conductivity of the channel portion, i.e. the impedance of the control means is raised. Alternatively, any timer suitable for integration in the circuitry and providing the desired current control may be used.

The invention has mainly been described above with reference to a number of explicitly disclosed embodiments. However, as is readily appreciated by a person skilled in the art, embodiments other than the ones disclosed above are equally possible within the scope of the invention, as defined by the appended patent claims. The light source described in relation to FIG. 7, may for example be exchanged for any suitable electrical component for the energy cells to power, such as LED, sensor, transistor display memory device etc. as has been described above. Such an exchange may imply that the value of the impedance of the resistance and the control element preferably is altered. Based on the teaching in this description the man skilled in the art will readily be able to determine which the appropriate impedance values are.

The invention claimed is:

1. A chargeable circuitry, comprising:
   an antenna arranged to receive EM-radiation from an external source and to convert said EM-radiation into electric energy;
   a rectifier arranged to receive electric energy from said antenna and convert said energy to a rectified current; and
   a dechargeable energy cell including:
      a first electrochemically active element and a second electrochemically active element, which are electronically separated from each other, and
      an electrolyte which is arranged in ionic contact with at least a portion of both said first and second electrochemically active elements, wherein
   said dechargeable energy cell is arranged to receive rectified current from said rectifier, and to convert said rectified current into stored energy by altering its electrochemical state in response to said rectified current, and
   said dechargeable energy cell is arranged of electrochromic material.

2. The chargeable circuitry according to claim 1, further comprising an electrical component arranged to receive current from said dechargable energy cell and to alter its state in response to said received current.

3. The chargeable circuitry according to claim 2, further comprising a control device arranged to restrain a supply of current from said dechargeable energy cell to said electrical component until a predetermined event has occurred.

4. The chargeable circuit according to claim 2, wherein said electrical component includes at least one of an LED, sensor, transistor, display and a diode.

5. The chargeable circuit according to claim 2, wherein said electrical component is an electrochemically active component.

6. The chargeable circuit according to claim 5, wherein said electrochemically active component is arranged of the same materials as said dechargeable energy cell.

7. The chargeable circuitry according to claim 1, wherein said dechargeable energy cell is arranged of electrochromic material.

8. The chargeable circuitry according to claim 7, wherein the dechargeable energy cell is arranged so as to visually detect a charge status.

9. The chargeable circuitry according to claim 1, wherein said chargeable circuitry is arranged on a flexible support.

10. The chargeable circuitry according to claim 9, wherein said chargeable circuitry is arranged on a support made of a paper and/or plastic based material.

11. The chargeable circuitry according to claim 1, wherein said chargeable circuitry is arranged to receive and rectify EM-radiation emitted from a wireless device.

12. The chargeable circuitry according to claim 1, wherein said chargeable circuitry is arranged to receive and rectify EM-radiation having a frequency corresponding to that used by at least one of a wireless communication system and a wireless identification system.

13. The chargeable circuitry according to claim 1, wherein said chargeable circuitry is arranged to receive and rectify EM-radiation emitted from a domestic device.

14. The chargeable circuitry according to claim 1, wherein the rectifier is arranged to rectify an alternating current having a frequency of between about 50 to about 60 Hz.

15. The chargeable circuitry according to claim 1, wherein said antenna is a dipole antenna.

16. The chargeable circuitry according to claim 1, wherein said antenna is a folded dipole antenna.

17. The chargeable circuitry according to claim 1, wherein the chargeable circuitry has a planar configuration.

18. The chargeable circuitry according to claim 1, wherein at least one of said antenna, said rectifier and said dechargeable energy cell has a planar configuration.

19. The chargeable circuitry according to claim 1, wherein said rectifier is arranged in series between said antenna and said dechargeable energy cell.

20. The chargeable circuitry according to claim 1, wherein at least one of said electrochemically active elements of said dechargeable energy cell comprises an organic material.

21. The chargeable circuitry according to claim 1, wherein at least one of said electrochemically active elements is arranged to alter its redox-state in response to said rectified current.

22. The chargeable circuitry according to claim 1, wherein at least a portion of said electrolyte is sandwiched between said first and second electrochemically active elements.

23. The chargeable circuitry according to claim 1, wherein said first and second electrochemically active elements are arranged in a common plane.

24. The chargeable circuitry according to claim 1, wherein the antenna has the shape of at least one of a visually readable text, cursive script, a logotype, a signature and a recognizable design.

25. The chargeable circuitry according to claim 1, wherein the antenna has the shape of a visually readable signature.

26. A chargeable circuit element comprising a chargeable circuitry according to claim 1 carried by a first chargeable circuit element layer, wherein the chargeable circuit element is arranged to be integrated in or on a target device.

27. The chargeable circuit element according to claim 26, wherein said first chargeable circuit element layer is made of a plastic based material.

28. The chargeable circuit element according to claim 26, wherein said first chargeable circuit element layer further comprises a first substrate and a second substrate arranged such that said antenna, said rectifier and said dechargeable energy cell are sandwiched between said first and second substrates.

29. The chargeable circuit element according to claim 26, wherein said chargeable circuit element is self-contained.

30. The chargeable circuit element according to claim 26, wherein the chargeable circuit element is sandwiched between a first and a second ply of paper.

31. A method of charging an energy cell, comprising:
   providing a chargeable circuitry;
   emitting EM-radiation from an EM-radiation device within a receiving range of said chargeable circuit;
   receiving said EM-radiation with an antenna of said chargeable circuit;
   converting said received EM-radiation to a rectified electric current with a device included in said chargeable circuit;
   providing said rectified electric current to said energy cell; and
   altering the electrochemical state of said energy cell by use of said rectified electric current such that energy is stored therein,
   wherein said energy cell is arranged of electrochromic material.

32. The method according to claim 31, wherein said emitting EM-radiation comprises activating the antenna of a wireless communication device such that it emits EM-radiation.

33. The method according to claim 31, wherein said activating the antenna comprises activating the antenna of a handheld device.

34. The method according to claim 31, further comprising controlling an electrical component, coupled to said energy cell, by de-charging at least a portion of said stored energy.

35. A method comprising:

using an electromagnetic field for charging a energy cell comprising including an electrochemically active element, providing a chargeable circuitry;

emitting EM-radiation from an EM-radiation device within a receiving range of said chargeable circuit;

receiving said EM-radiation of said chargeable circuit;

converting said received EM-radiation to a rectified electric current;

providing said rectified electric current to said energy cell; and altering the electrochemical state of said energy cell by use of said rectified electric current such that energy is stored therein, wherein said energy cell is arranged of electrochromic material.

* * * * *